United States Patent [19]

Valcalda

[11] 4,144,964

[45] Mar. 20, 1979

[54] FLEXIBLE SUPPORT DESIGNED TO SUPPORT THE CONVEYOR BELT OF A CONVEYOR

[75] Inventor: Florent Valcalda, Louveciennes, France

[73] Assignee: Pneumatiques, Caoutchouc Manufacture et Plastiques Kleber-Colombes, Colombes, France

[21] Appl. No.: 760,321

[22] Filed: Jan. 18, 1977

Related U.S. Application Data

[63] Continuation-in-part of Ser. No. 570,991, Apr. 22, 1975, abandoned.

[30] Foreign Application Priority Data

Apr. 22, 1974 [FR] France .............................. 74 14129

[51] Int. Cl.[2] ............................................. B65G 39/04
[52] U.S. Cl. ..................................... 198/830; 198/808; 198/824
[58] Field of Search ................ 198/818, 819, 823, 824, 198/825, 826, 827, 828, 829, 830, 808

[56] References Cited

U.S. PATENT DOCUMENTS

| | | | |
|---|---|---|---|
| 1,266,363 | 5/1918 | Wentz | 198/830 |
| 2,417,477 | 3/1947 | Finney, Jr. | 198/825 |
| 2,575,598 | 11/1951 | Shank | 198/830 |
| 2,862,607 | 12/1958 | Stamos et al. | 198/827 |
| 2,876,890 | 3/1959 | Baechli | 198/824 |
| 3,043,419 | 7/1962 | Morrow | 198/827 |
| 3,055,487 | 9/1962 | Roley | 198/828 |
| 3,058,573 | 10/1962 | Lo Presti | 198/827 |
| 3,089,580 | 5/1963 | Dilgard | 198/826 |
| 3,200,939 | 8/1965 | Poundstone | 198/808 |

FOREIGN PATENT DOCUMENTS

| | | | |
|---|---|---|---|
| 522258 | 9/1953 | Belgium | 198/827 |
| 2319023 | 10/1974 | Fed. Rep. of Germany | 198/827 |
| 512719 | 2/1955 | Italy | 198/829 |
| 134186 | 12/1960 | U.S.S.R. | 198/827 |
| 150049 | 10/1961 | U.S.S.R. | 198/826 |
| 438590 | 1/1975 | U.S.S.R. | 198/830 |

*Primary Examiner*—Robert B. Reeves
*Assistant Examiner*—Richard K. Thomson
*Attorney, Agent, or Firm*—Craig & Antonelli

[57] ABSTRACT

A flexible support for supporting a conveyor belt of a conveyor having a frame. The flexible support includes at least one flexible element extending beneath a portion of the width of the conveyor belt, which flexible element is attached in the region of the ends thereof to the frame of the conveyor. The length of the flexible element is greater than the linear distance between the attached ends of the flexible element and the flexible element delimits support areas for supporting a portion of the width of the conveyor belt extending at least on opposite sides with respect to the longitudinal median plane of the conveyor. The at least opposite side support areas of the flexible element are responsive to the travel of the conveyor belt for being drawn in the travel direction independently of one another.

19 Claims, 7 Drawing Figures

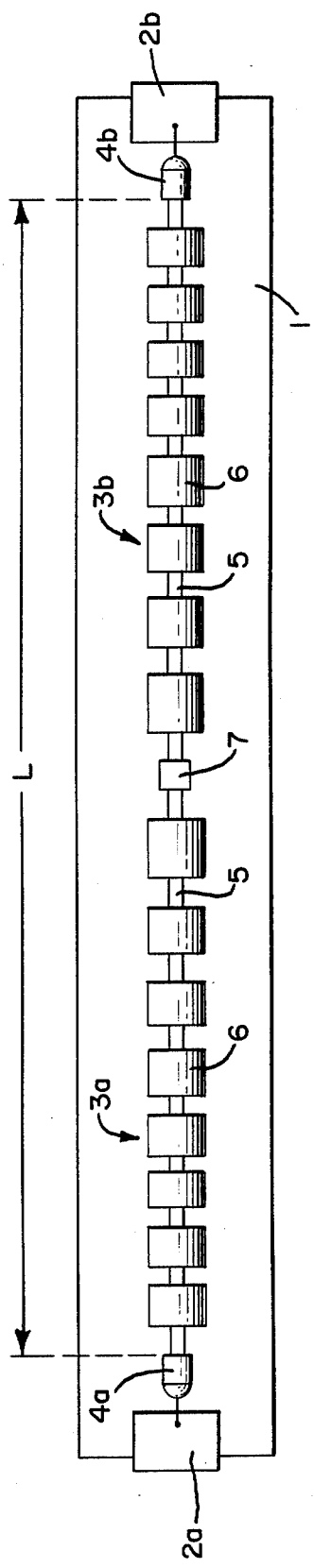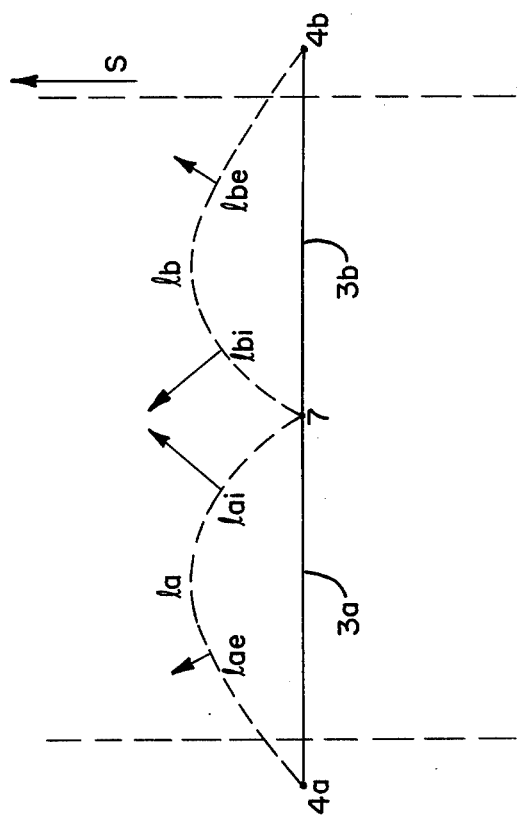

FLEXIBLE SUPPORT DESIGNED TO SUPPORT THE CONVEYOR BELT OF A CONVEYOR

This is a continuation-in-part application of application Ser. No. 570,991, filed Apr. 22, 1975, now abandoned, the subject matter of which is incorporated by reference herein.

The present invention relates to the supports on which a carrier belt of a conveyor rests and moves.

Rigid supports are known which are constituted of assemblies of a plurality of rigid cylindrical rollers — generally three — which are mounted loosely on spindles which are integral with the structure of the carrier and are arranged so that the lateral rollers are tilted from the horizontal. These rigid supports are used often because they are rugged and because their conditions of use are well known, but they present the inconveniences of being relatively expensive because their manufacture necessitates precise tooling and only rather shallow troughs or channels can be effected, in other words, troughs of which the lateral parts form a relatively slight angle with respect to the horizontal, for example 30° (the trough is the concavity facing upward which is given to the carrier part of the belt to increase its sectional capacity, in other words the volume of loose materials which can be carried per unit of length).

The "flexible supports" are also known which are essentially constituted of a flexible element, such as a cable, provided with stationary rollers on each side of the carrier structure by means of devices in which they can freely revolve, the devices being situated above the carrier belt and separated by a smaller distance than the length of the support element, in such a manner that the element forms an upward facing concave curve on which the belt rests by finding its equilibrium transversely.

These flexible supports constituted of a flexible element are easy to realize, to mount and to replace, and with such flexible supports the loaded belt takes its balanced form of its own accord. Before, it was thought that it would suffice to increase the length of such flexible supports in order to increase the depth of the trough and thus the sectional capacity of the belt, but actually that is not so and in fact all of these flexible supports actually have the major inconvenience of not allowing the belt to have a deep trough and thus not allowing the belt to have a satisfactory sectional capacity.

In fact, the moving belt draws the support forward and causes the two parts of the support between the middle of the carrier and its ends to tilt relative to the transverse line of the carrier. The rubbing of the belt on the supports in these conditions also includes transverse components which are directed outward, which tend to push the carrier belt away from its supports.

For this reason, an instability of the carrier belt while in movement has been necessarily accepted in the use of flexible supports, until this time. This instability is more marked in proportion with the larger size transverse components; these components are larger with increased depth of the trough and velocity of belt movement because both of them increase the forward tilt of the parts of the flexible support which are situated between the center and the ends. The importance of this phenomenon is such that the flexible supports cannot be used except on the condition that the linear velocity of the belt is not very high and that its trough is not very deep. In other words, on the condition that the transport capacity is relatively low considering the width of the belt.

Different arrangements have been proposed to remedy this major inconvenience, but they have not been proven effective. For example, rollers for the flexible element have been proposed on which the carrier belt will rest, and it is proposed to interlock these rollers in such a manner that they turn at the same angular velocity, and to give the center rollers a larger diameter. By this arrangement, the peripheral velocity of these rollers at the center is to be greater than the linear velocity of the belt, so that when the belt moves the flexible support is drawn along so that its concavity is turned rearward. This structure complicates the construction of the flexible supports and makes them more expensive and causes great wear of the central part of the belt. Additionally, it is of only limited efficiency and can be used only on condition that the trough is not very deep, i.e. shallow.

In other words, until now, flexible supports have not been able to be used, and are used only in conveyors where the trough of the carrier belt is shallow in spite of the other advantages which they have relative to the rigid supports constituted of an assembly of rollers.

On the other hand, the rigid supports do not show this inconvenience because it suffices to tilt the lateral rollers rearward so that the rubbing of the transverse components stabilizes the belt. However, with the rigid supports it is no longer possible to give the carrier belt as deep a trough as desired, on the one hand because the deformations hereby imposed on the belt are excessive and on the other hand because the construction of these supports would have to include numerous rollers and would be too complicated and costly.

It is therefore an object of the present invention to provide supports of the flexible type which are easy to manufacture and not costly and which permit increase of the sectional capacity of the carrier belts, and generally have a transport capacity which is well above that of known flexible and rigid supports.

In particular, an object of the invention is to provide supports such that the carrier belt can be deformed into a deep trough and can move at a high linear velocity without any tendency to unbalance.

In accordance with the present invention, supports similar to flexible supports are provided and constituted of one or more substantially inextensible elements of greater length than the distance separating the points at which their ends are attached to the conveyor structure, and having flexibility such that they can be deformed with the effect of their own weight into a curve with a small radius and can provide a deep trough.

These supports are essentially characterized by the fact that they are arranged in such a fashion that when the carrier belt moves, the support part which is situated to the right of the median longitudinal plane of the conveyor is drawn forward independently of the support part which is situated to the left of this plane, and vice versa.

These and further objects, features and advantages of the present invention will become more obvious from the following description when taken in connection with the accompanying drawings which show, for purposes of illustration only, several embodiments in accordance with the present invention; and wherein FIG. 1 is a planar diagram of a prior art flexible support;

FIG. 4 is a planar view of the support of FIG. 3;

FIG. 5 is a planar diagram of the support of FIG. 3;

Figure 1:
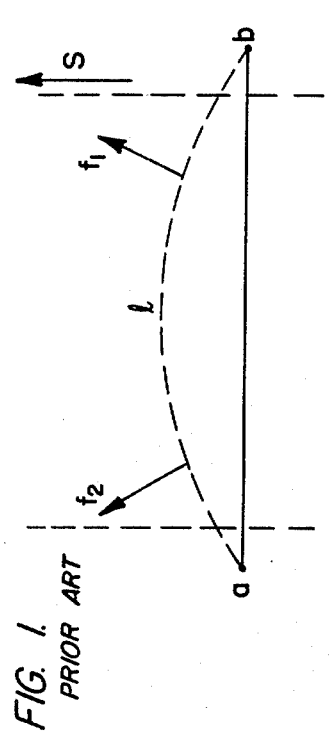

Referring now to the drawings, there is shown in FIG. 1 a planar diagram of a prior art flexible support. The support extends along the whole length of the conveyor and is attached to the structure of the conveyor by its ends, at two points a and b above the carrier belt. When the belt is motionless or immobile, the support extends along the straight line of FIG. 1, but when the belt is moved in the direction of the arrow s, the support is drawn forward and its projection is shown by the curved broken line 1. The friction or rubbing of the belt on the flexible support shown by arrows f1 and f2, which has lateral or transverse components which draw the belt toward the outside and cause its instability. These lateral components are greater in proportion with the increased curving of line 1, and thus are greater in proportion with an increased depth of the trough and the velocity of the belt movement. Because of these facts, and in order that these lateral components do not disturb the function of the conveyor beyond that which is acceptable, in accordance with the prior art the trough is made shallow and the carrier belt moves actually almost flat, at a relative low velocity. Accordingly, for a given belt width, the transport capacity of a conveyor provided with flexible supports in accordance with prior art arrangements is low, and despite all of the advantages which they present otherwise, they can be used only in cases where they are indispensable, for example when the carrier belt must be able to move in two directions.

Figure 2:
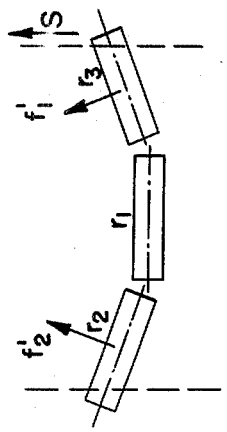
FIG. 2 is a planar diagram of a prior art rigid support constituted of three rollers mounted loosely around their spindles.

FIG. 2 is a planar diagram of a rigid prior art support composed of three rollers r1, r2 and r3, mounted loosely on their spindles. A central roller r1 is horizontal and perpendicular to the direction of the belt whereas the lateral rollers r2 and r3 are tilted upward (in a forward view the three rollers form a U) in such a manner that they form the trough, and are also tilted rearwardly, as shown in the drawing, so that the friction of the belt on the rollers (arrows f'1 and f'2), the lateral components are directed toward the inside of the conveyor which centers and stabilizes the belt. However, these supports cause transverse deformation of the belt corresponding to the desired trough (whereas with the flexible supports, the belt takes its form of equilibrium directly from the supports) and, as this deformation must not be excessive, there is a necessity to limit the depth of the trough to less than desirable depth (practically, the lateral rollers are tilted upward at an angle rarely beyond 30°). Besides, the friction which is caused voluntarily by tilting the lateral rollers results in wear of the lateral parts of the belt and the appearance of axial forces on the rollers which imposes on these rollers a tilt limitation to a few degrees.

The prior art, shown in FIGS. 1 and 2, shows that in spite of all of the attempts which have been made on conveyors and especially on supports during the past decades, workers have not been able to essentially increase the transport capacity of the carrier belt of any predetermined width.

Figure 3:
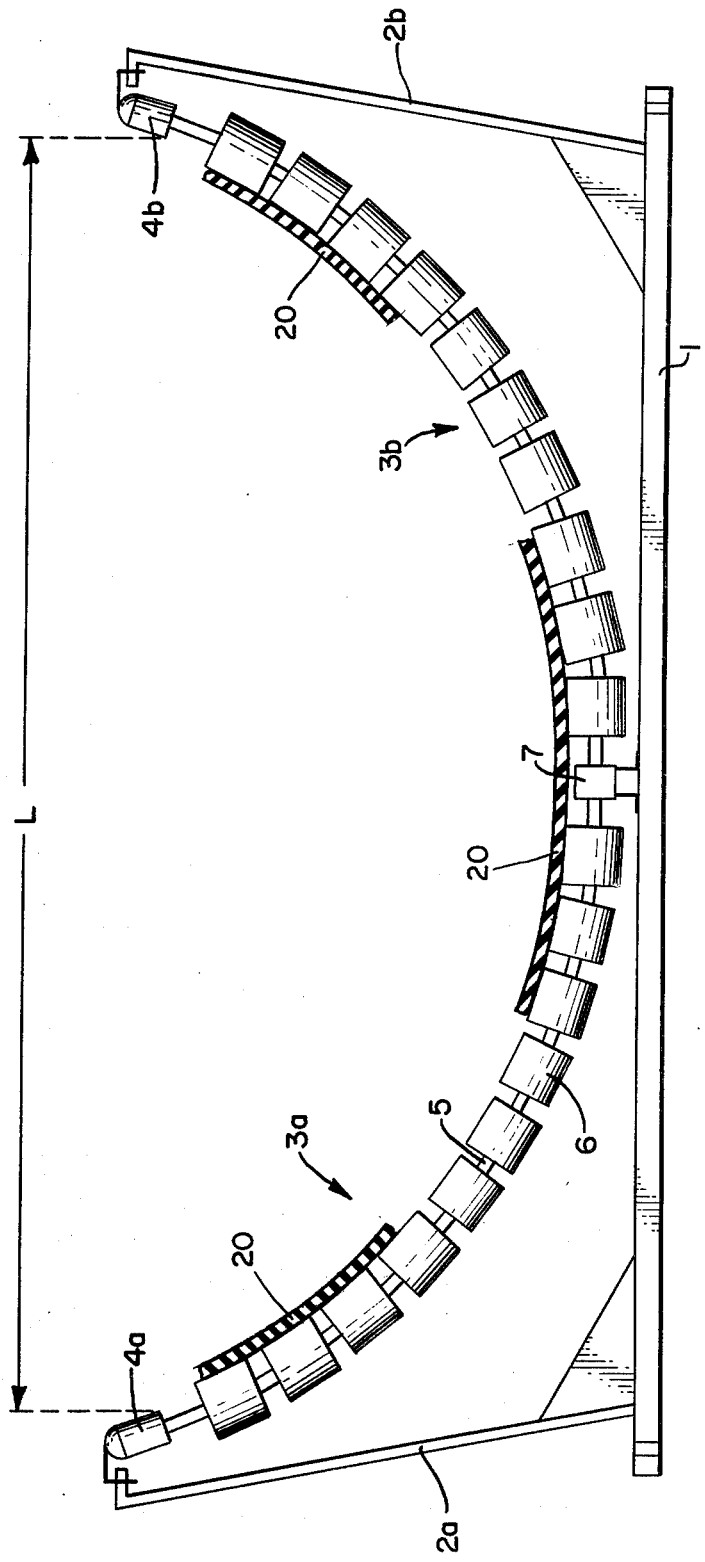
FIG. 3 is an elevational view of a support according to the present invention.

The flexible support of the invention, shown in FIGS. 3 and 4, is attached to the structure of the conveyor in a known and conventional manner by mountings constituted of a plate 1 with lateral arms 2a and 2b. The support, as traditional, is constituted of a flexible element attached to the ends of lateral arms 2a and 2b by means of members 4a and 4b. The members 4a and 4b may be roller casings in which the support can revolve freely; these roller casings being separated from each other by a distance L. The flexible element is essentially inextensible with its length being greater than the distance L, and its flexiblity is such that when its ends are attached to roller casings 4a and 4b, it is deformed under its own weight and forms a curve corresponding to the trough which is desired for the carrier belt 20 shown in a cutaway partial sectional view.

In the embodiment, the flexible element is a rubber cylinder 5, reinforced with wires or longitudinal metallic cables (for example, a metallic cable encased in rubber) to which are mounted cylindrical rollers 6, all having the same diameter. With this the carrier belt, by moving, sets rollers 6 tightly attached to rubber cylinder 5 and rubber cylinder 5 in rotation. Alternatively, the members 4a and 4b may serve for attaching the flexible support to lateral arms 2a and 2b in such a manner that it does not rotate and, as a result, only the cylindrical rollers 6 are rotated with respect to the cylinder 5 which is stationary.

Also, it is possible to rest the carrier belt directly on the flexible element, the same as rubber cylinder 5, reinforced with wires or longitudinal metallic cables, without providing the flexible element with rollers.

The invention rests on the surprising discovery that, if the arrangement is such that the parts of the flexible support to the right and to the left of the longitudinal plane of symmetry of the conveyor are drawn rearwardly independent of one another when the belt moves, there is no disclosed tendency to instability and to throwing the belt out of center, even if the trough is deep and even if the linear velocity of the belt is high.

In the embodiment shown in FIGS. 3 and 4, this arrangement is obtained by placing the rubber cylinder 5 at its center in a roller casing 7 which is attached to the plate 1. Therefore, the flexible element is divided into two identical parts 3a and 3b which are situated on the two sides of the median plane of the conveyor and which, when the belt moves, are drawn along forward independent of each other.

Analogous to the explanation given for the instability of the belts moving on prior art flexible supports, the present invention can be considered as the deformation of each of the parts which is responsible for the great stability of the belt by causing the appearance of transverse components which are directed toward the inside of the conveyor, as is shown by the arrows in the diagram of FIG. 5. As is illustrated in this figure, the flexible element is attached to the structure of the conveyor by the two end roller casings 4a and 4b and by the central roller casing 7, in which it freely revolves. When the carrier belt is displaced in the direction of the arrow s, each of parts 3a and 3b is drawn forward and is projected on a horizontal plane as shown by broken lines 1a and 1b. Each line 1a and 1b has one part (1ai and 1bi) which is situated toward the inside of the conveyor, which is tilted forward, the other part (1ae and 1be) being situated toward the outside of the conveyor, and being tilted rearward. The friction of the belt on inner parts 1ai and 1bi directs the transverse components toward the inside of the conveyor and the friction on parts lae and lbe of the transverse components directs them toward the outside. As on the one hand, the friction on parts lai and lbi is in the central zone of the belt which is the zone supporting the greatest part of the weight of the material being transported, the friction (fai and fbi) on these parts is much greater than the friction (fae and fbe) on the outer parts lae and lbe. Additionally, the angle of parts lai and lbi with the transverse direction is greater than that of parts lae and lbe with this same direction. Accordingly, the transverse components which result from friction on parts lai and lbi and directed toward the inside are much greater than those transverse components resulting from friction on parts lae and lbe and directed toward the outside, and this causes the permanent centering of the belt.

The present invention thus limits instability of the belt by use of flexible supports and provides the following remarkable qualities: ease of construction, mounting, replacement, deep trough depth, and deformation of the belt which takes its form of equilibrium of its own accord.

Figure 6:
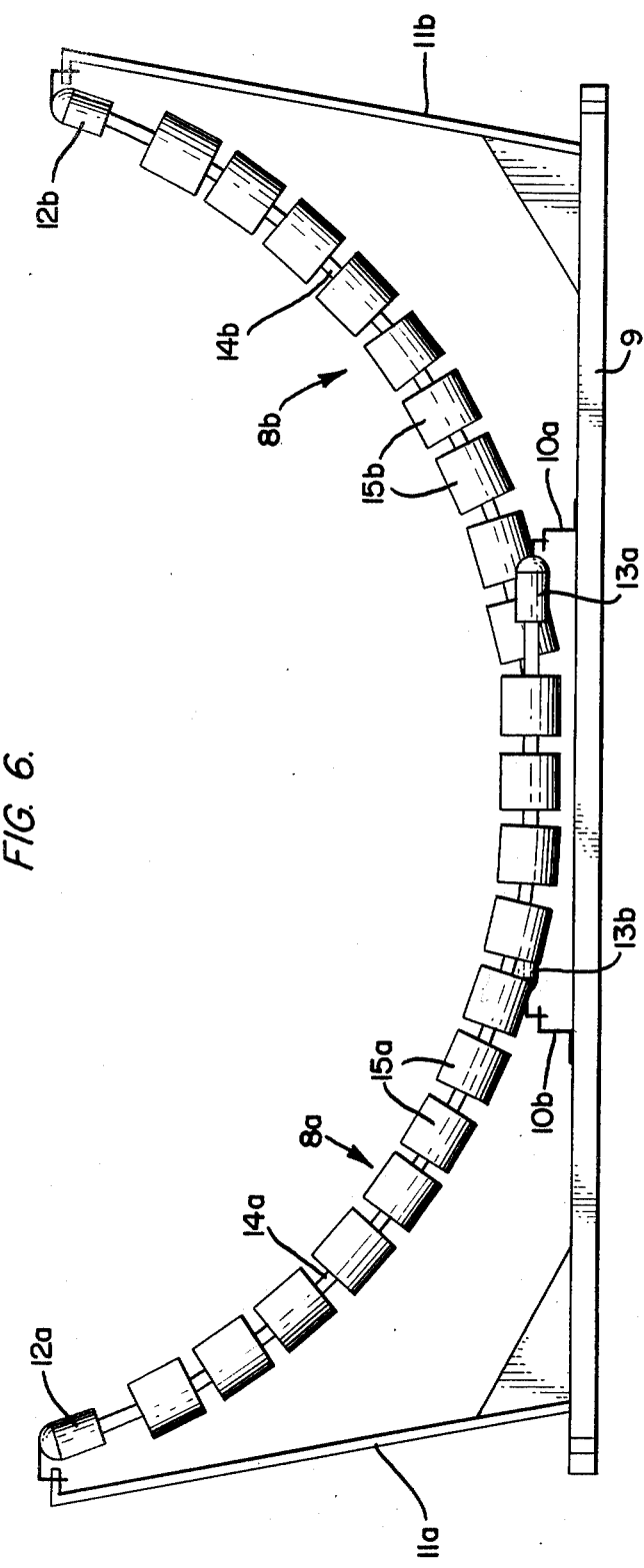
FIG. 6 is an elevational view of another embodiment of the support according to the present invention.
Figure 7:
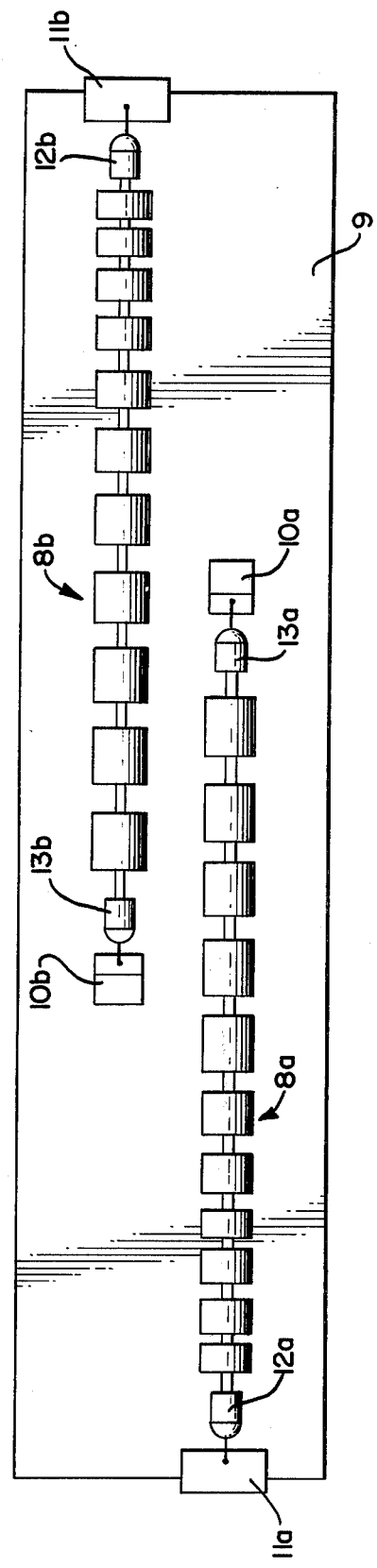
FIG. 7 is a planar view of the support of FIG. 6.

In accordance with another embodiment of the present invention as illustrated in FIGS. 6 and 7, the support is constituted of two flexible elements 8a and 8b which are attached to the structure of the conveyor by means of a mounting constructed, as in the preceding embodiment, of a plate 9 with arms 10a and 11a, 10b and 11b to which the flexible elements 8a and 8b are respectively hooked onto by means of roller casings 12a and 13a, 12b and 13b.

The two flexible elements 8a and 8b are similar to the flexible element of the preceding embodiment and are in the form of rubber cylinders 14a and 14b, which are essentially inextensible and reinforced with wires or metallic cables. The cylinders 14a and 14b carry rollers 15a and 15b on which rests the carrier belt. They are identical with their length being greater than the distance separating their attachment points so that, with their flexibility, they are deformed under the effect of their own weight. The supports are arranged perpendicular to the direction of movement of the carrier belt and are stepped relative to each other in the longitudinal direction.

The arms 11a and 11b, situated toward the outside, are identical and are of such height that the attachment point of the corresponding end of element 8a or 8b is situated above the carrier belt. The arms 10a and 10b are situated toward the inside and are identical and are each placed, relative to corresponding arms 11a or 11b, above the median longitudinal symmetrical plane of the conveyor. The height of arms 10a and 10b is the same and is such that the attachment point of the corresponding end of element 8a or 8b is situated just above the bottommost point of the trough which is provided as desired for the carrier belt. With this construction, elements 8a and 8b are deformed in identical curves and form a trough constituted of two longitudinally spaced parts. When the carrier belt moves, its central zone generally passes both on element 8a and simultaneously on element 8b, while its lateral zones generally do not pass on either element 8a or element 8b depending on the loading of the belt.

The assembly formed by the two elements 8a and 8b functions in the same manner as the single flexible element, attached at its center, of the preceding embodiment. It is to be noted that in this embodiment the use of the invention is more complicated than in the preceding embodiment. However, it is possible to have recourse to this embodiment when the weight per unit of length of the loaded carrier belt is great for its central zone, which is the part on which the greatest force of the load is exerted, is then sustained by the two elements 8a and 8b or even when the conveyor is placed in such conditions that it is to be feared that the flexible support is to be damaged. In such a case, it suffices to replace one of the two elements 8a or 8b needing replacement. Also, it is possible to utilize additional elements in dependence of loading, for example.

It has been noted that the supports in the embodiment of two elements had a much longer life (three or four times longer) and consumed much less energy (two times less) than the supports of the first embodiment or than prior art flexible supports.

The invention can also be used by making the first embodiment of the flexible element in two identical parts which are both connected to central roller casing 7, in which they revolve freely, and the length of each of these parts is greater than the distance separating the attachments of their ends to the outer arms which are integral with the structure and the central roller casing.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A flexible support for supporting a conveyor belt of a conveyor having a frame, comprising at least one individual, flexible and substantially inextensible element extending beneath a portion of the width of the conveyor belt, the at least one individual flexible element being flexible between the ends thereof such that the element is deformable under its own weight into a curve, first means for attaching the at least one individual flexible element at each of its ends to the frame of the conveyor with the length of the at least one individual flexible element being greater than the linear distance between the attached ends of the at least one individual flexible element, the at least one individual flexible element delimiting support areas for supporting a portion of the width of the conveyor belt extending at least on opposite sides with respect to the longitudinal median plane of the conveyor, the at least opposite side support areas of the at least one individual flexible element being responsive to the travel of the conveyor belt for being drawn in the travel direction independently of one another, and the at least one individual flexible element being flexible at least in a region extending from an attached end to at least the immediate area of the longitudinal median plane of the conveyor.

2. A flexible support according to claim 1, wherein two parallel flexible elements extending perpendicularly to the longitudinal median plane of the conveyor are provided, said two flexible elements being spaced longitudinally relative to one another and each flexible element having one part attached by said first attaching means to the frame of the conveyor in a region outside the area of the conveyor belt and another part attached by said first attaching means to the frame of the conveyor in a region proximate to the longitudinal median plane of the conveyor.

3. A flexible support according to claim 2, wherein each of the flexible elements extend beyond the longitudinal median plane of the conveyor and said first attaching means attaches the another part of each flexible element on opposite sides of the longitudinal median plane of the conveyor.

4. A flexible support according to claim 2, wherein said first attaching means permits each flexible element to rotate freely with respect thereto.

5. A flexible support according to claim 2, wherein said first attaching means non-rotatably attaches each flexible element to the frame of the conveyor, each flexible element being provided with roller members mounted thereon for free rotation with respect thereto, the conveyor belt resting on the roller members.

6. A flexible support according to claim 2, wherein each flexible element forms a curve with said flexible elements being arranged and operatively associated to form a supporting assembly that extends beneath and across the width of the conveyor belt and which shapes the belt into a deep trough curved configuration.

7. A flexible support according to claim 1, wherein said first attaching means permits the at least one flexible element to rotate freely with respect thereto.

8. A flexible support according to claim 7, wherein said at least one flexible element is provided with cylindrical members rigidly mounted thereon and having substantially the same outside diameter.

9. A flexible support according to claim 1, wherein said first attaching means non-rotatably attaches the at least one flexible element to the frame of the conveyor, the at least one flexible element being provided with roller members mounted thereon for free rotation with respect thereto, the conveyor belt resting on the roller members.

10. A flexible support according to claim 1, wherein said at least one flexible element is arranged to form a curve that extends across a portion of the width of the conveyor belt and that shapes that portion of the belt into the form of a curved, deep trough.

11. A flexible support for supporting a conveyor belt of a conveyor having a frame, comprising at least one individual, flexible and substantially inextensible element extending beneath a portion of the width of the conveyor belt, the at least one individual flexible element being flexible between the ends thereof such that the element is deformable under its own weight into a curve, first means for attaching the at least one flexible element at each of its ends to the frame of the conveyor with the length of the at least one flexible element being greater than the linear distance between the attached ends of the at least one flexible element, the at least one flexible element delimiting support areas for supporting a portion of the width of the conveyor belt extending at least on opposite sides with respect to the longitudinal median plane of the conveyor, the at least opposite side support areas of the at least one flexible element being responsive to the travel of the conveyor belt for being drawn in the travel direction independently of one another, the at least one individual flexible element extending over the entire width of the conveyor, and second means for attaching a central part of the at least one flexible element to the frame of the conveyor.

12. A flexible support according to claim 11, wherein a single flexible element is provided, the single flexible element being a substantially inextensible member.

13. A flexible support according to claim 11, wherein the at least one flexible element is formed of two identical portions extending on opposite sides with respect to the longitudinal median plane of the conveyor, one part of each portion in the region of the longitudinal median plane of the conveyor being attached by said second attaching means to the frame of the conveyor in the region of the longitudinal median plane and another part of each portion being attached by said first attaching means to the frame of the conveyor in a region outside of the area of the conveyor belt.

14. A flexible support according to claim 11, wherein said first and second attaching means permit the at least one flexible element to rotate freely with respect thereto.

15. A flexible support according to claim 11, wherein said first and second attaching means non-rotatably attaches the at least one flexible element to the frame of the conveyor, the at least one flexible element being provided with roller members mounted thereon for free rotation with respect thereto, the conveyor belt resting on the roller members.

16. A flexible support for supporting a conveyor belt of a conveyor having a frame, comprising at least two individual, flexible and substantially inextensible elements extending beneath a portion of the width of the conveyor belt, each of the individual flexible elements being flexible between the ends thereof such that each element is deformable under its own weight into a curve, first means for attaching the at least two flexible elements at each of their respective ends to the frame of the conveyor with the length of each of the flexible elements being greater than the linear distance between the respective attached ends of the respective flexible elements, the at least two flexible elements delimiting support areas for supporting a portion of the width of the conveyor belt extending at least on opposite sides with respect to the longitudinal median plane of the conveyor, the at least opposite side support areas of the at least two flexible elements being responsive to the travel of the conveyor belt for being drawn in the travel direction independently of one another, and wherein at least two parallel flexible elements extend perpendicularly to the longitudinal median plane of the conveyor, said at least two parallel flexible elements being spaced longitudinally relative to one another, each flexible element forming a curve with said at least two individual flexible elements being arranged and operatively associated to form a supporting assembly that extends beneath and across the width of the conveyor belt and which shapes the belt into a deep trough curved configuration.

17. A flexible support according to claim 16, wherein said first attaching means permits each flexible element to rotate freely with respect thereto.

18. A flexible support according to claim 17, wherein each flexible element is provided with cylindrical members rigidly secured thereto, said cylindrical members being of substantially the same outside diameter.

19. A flexible support according to claim 16, wherein said first attaching means non-rotatably attaches each flexible element to the frame of the conveyor, each flexible element being provided with roller members mounted thereon for free rotation with respect thereto, the conveyor belt resting on the roller members, the roller members having substantially the same outside diameter.

* * * * *